Dec. 29, 1964   N. R. DE. BOER   3,163,432
COUPLINGS FOR PIPES
Filed Sept. 2, 1959
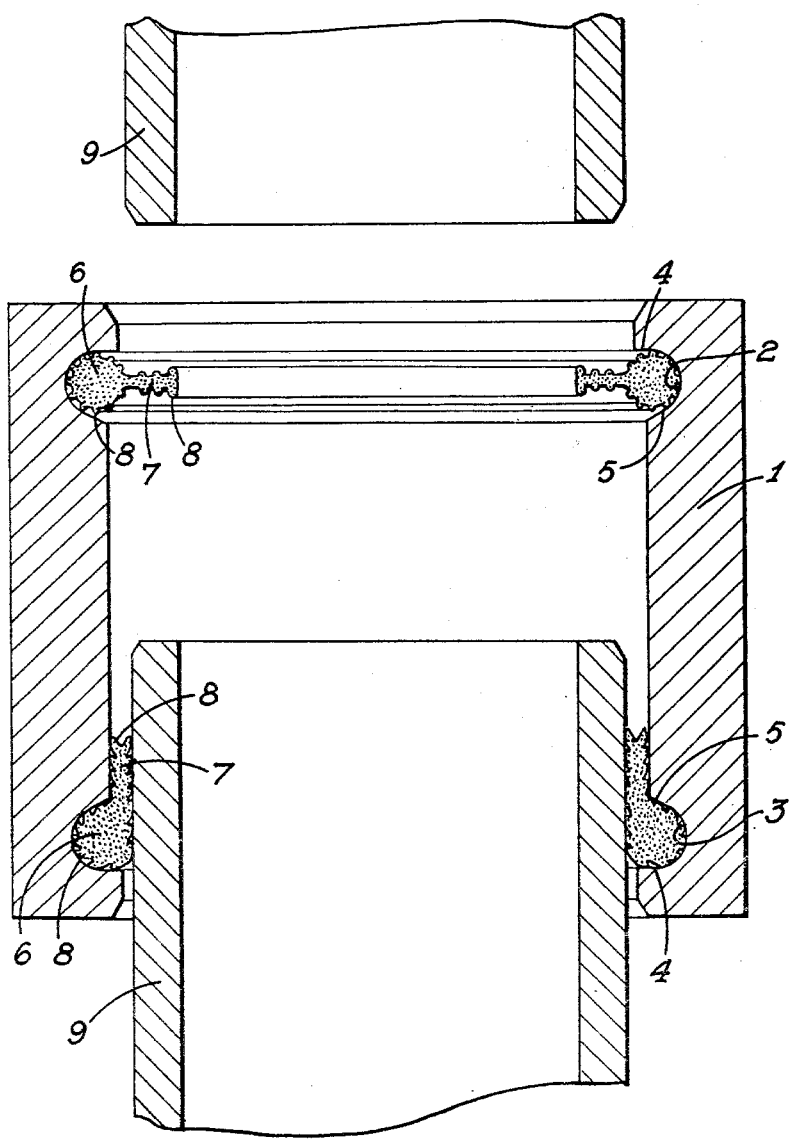

United States Patent Office 3,163,432
Patented Dec. 29, 1964

3,163,432
COUPLINGS FOR PIPES
Nicolaas R. de Boer, Goor, Netherlands, assignor to Societe Anonyme Eternit, Kapelle-op-den-Bos, Belgium, a Belgian company
Filed Sept. 2, 1959, Ser. No. 837,731
Claims priority, application Belgium Sept. 11, 1958
2 Claims. (Cl. 277—209)

This invention relates to couplings for pipes.

According to the present invention there is provided a coupling for connecting the ends of pipes, the coupling comprising a sleeve having in the internal surface thereof an annular groove adjacent each end of the sleeve, there being a sealing ring in each groove, wherein each ring comprises a toroidal portion lodged in the groove and an annular web initially extending inwardly from said toroidal portion, the arrangement being such that as a pipe is entered into said sleeve, said web is displaced to become gripped between the wall of the pipe and the wall of the sleeve in such manner that the pressure of a fluid subsequently passed through the coupling compresses said web.

For a better understanding of the invention and to show how the same may be carried into effect reference will now be made to the accompanying drawing in which the single figure is an axial sectional view of a partly completed coupling.

A sleeve 1 has two grooves 2 and 3, the side wall 4 of each groove 2, 3 being perpendicular to the axis of the sleeve 1 and the side wall 5 being inclined to said axis such that the mouth of the groove is wider than the bottom. Rings made of resilient material, for example rubber, are lodged one in each of the grooves 2 and 3. The rings each have a toroidal portion 6 and an inwardly directed annular web 7, both the portion 6 and the web 7 being provided with rib 8 which initially extend normal to the surface from which they project.

When pipes 9 are entered one into each end of the sleeve 1, each web 7 is bent out of its initial position to lie approximately parallel with the axis of the sleeve 1 and is gripped between the sleeve 1 and the adjacent pipe 9. The pipes 9 may be of fibre-cement. The pressure of a fluid passing through the coupling tends to compress the web 7 and press it against the adjacent walls of the sleeve 1 and the pipe 9. At the same time, toroidal portion 6 is pressed into the bottom of the groove in which it is lodged. The entry of each pipe 9 into the sleeve 1 also causes the ribs 8 on the adjacent ring to be deformed as shown on the lower part of the figure and in such deformed condition the ribs 8 act as a plurality of sealing elements, bearing against the adjacent walls of the pipe 9 and the sleeve 1 by virtue of the resilience of the material of the ring and by virtue of the pressure of the fluid in the pipes 9.

The entry of the pipes 9 into the sleeve, can be facilitated by using a lubricant such as a soap or an oil which lubricant of course has to be chosen so that it does not affect the material of which the rings are made.

I claim:

1. A coupling comprising a hollow sleeve element having a cylindrical bore of determinable diameter, said sleeve element having an end and an annular groove adjacent said end opening into said bore, a resilient sealing ring supported in said groove, said sealing ring comprising a toroidal portion in said groove and an annular web extending radially inwards from said toroidal portion, said annular web having an opening for accommodating therein in sealing relation a pipe adapted for enabling the flow of fluid at high pressure therethrough, the pipe having an outside diameter which is smaller than the inside diameter of the sleeve element and larger than the opening in the web, the annular web being deformed by said pipe to a position between the sleeve element and the pipe and being compressed throughout its length between the pipe and the sleeve element, a plurality of ribs on said annular web and extending normally therefrom with the web in undeflected position, the ribs being engaged against said sleeve element and pipe to be deformed thereby, the pressure of said fluid being effective to further compress said web between said pipe and sleeve element to strengthen the seal formed by said web between the pipe and sleeve element, a plurality of ribs on said toroidal portion extending radially outward therefrom, a portion of the latter said ribs being compressed against the sleeve element in said groove with said pipe inserted in said sleeve, the remainder of said ribs on the toroidal portion being compressed against said pipe, said ribs on the toroidal portion being further compressed by the pressure of the fluid in said pipe, said sleeve element at said groove having lateral sides, the side nearest the end of the sleeve being radially directed, the other side being inclined to form a radially divergent groove.

2. A coupling comprising a hollow sleeve element having a longitudinal axis, said sleeve element having an axial cylindrical bore of determinable diameter, said sleeve element having opposite ends and an annular groove adjacent each of the ends opening into the bore, each said groove having an arcuate portion and a divergent portion extending from said arcuate portion opening into said bore, said sleeve having lateral sides bounding each of the grooves in the divergent portion thereof, one of the sides being nearer the associated end of the sleeve and being directed perpendicularly to said axis, the other side being inclined away from the first said side, an elastic sealing ring for each groove comprising a toroidal portion in the associated groove and an annular web portion extending radially inwards from said toroidal portion into said bore, a plurality of ribs uniformly on the toroidal and web portions of the rings and extending perpendicularly therefrom, said web portion of the rings defining an opening therein, said sealing rings being each adapted for accommodating within said sleeve element in sealing fashion a pipe having an external diameter less than that of said bore and greater than that of the opening in the web portion, said web portion of the sealing rings, with a pipe inserted therein, being deformed to a position between the pipe and the sleeve element and being compressed for substantially the full length thereof between said pipe and sleeve element, the web portion facing in the direction of insertion of the pipe, said ribs on the web portion being deformed to face in the direction of insertion of the pipe, said ribs on the toroidal portion being also deformed as a consequence of insertion of the pipe, a portion of the ribs on the toroidal portion remaining within the groove and being deformed therein against said sleeve, the remainder of the ribs on the toroidal portion being in contact with and deformed against the pipe, said ribs on said ring being compressed by the pressure of the fluid flowing through said pipe to reinforce the sealing effect obtained between the pipe and sleeve element as furnished by said ribs.

References Cited in the file of this patent

UNITED STATES PATENTS

| | | |
|---|---|---|
| 2,032,492 | Nathan | Oct. 13, 1934 |
| 2,245,153 | McWane | May 4, 1939 |
| 2,253,232 | Gheen | Aug. 19, 1941 |
| 2,786,697 | Rescheneder | Mar. 26, 1957 |

FOREIGN PATENTS

| | | |
|---|---|---|
| 644,600 | Germany | May 8, 1937 |
| 622,058 | Great Britain | Apr. 26, 1949 |
| 550,596 | Italy | Nov. 3, 1956 |
| 551,357 | Italy | Nov. 19, 1956 |